(12) United States Patent
Hagshenas

(10) Patent No.: US 7,337,605 B2
(45) Date of Patent: Mar. 4, 2008

(54) THERMAL MANAGEMENT FOR AIRCRAFT AUXILIARY POWER UNIT COMPARTMENT

(75) Inventor: Bezhad Hagshenas, San Diego, CA (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 521 days.

(21) Appl. No.: 10/963,363

(22) Filed: Oct. 11, 2004

(65) Prior Publication Data

US 2005/0268593 A1    Dec. 8, 2005

Related U.S. Application Data

(60) Provisional application No. 60/510,802, filed on Oct. 10, 2003.

(51) Int. Cl.
*F02C 7/06* (2006.01)
*F02G 3/00* (2006.01)

(52) U.S. Cl. ........................... 60/39.08; 244/58

(58) Field of Classification Search ............... 60/39.83, 60/39.08; 244/53 R, 53 B, 57, 58
See application file for complete search history.

(56) References Cited

U.S. PATENT DOCUMENTS

| 5,265,408 | A | * | 11/1993 | Sheoran et al. | ............... | 60/782 |
| 5,655,359 | A | * | 8/1997 | Campbell et al. | ............. | 60/772 |
| 6,092,360 | A | * | 7/2000 | Hoag et al. | ................... | 60/783 |
| 6,651,929 | B2 | * | 11/2003 | Dionne | ........................ | 244/57 |
| 6,942,181 | B2 | * | 9/2005 | Dionne | ........................ | 244/57 |
| 7,040,576 | B2 | * | 5/2006 | Noiseux et al. | .......... | 244/129.2 |
| 7,152,410 | B2 | * | 12/2006 | Sheoran et al. | ............... | 60/782 |

* cited by examiner

*Primary Examiner*—William H. Rodriguez
(74) *Attorney, Agent, or Firm*—Stephen G. Mican

(57) ABSTRACT

An improved passive cooling system for an aircraft APU compartment that includes a lightweight annular air-cooled oil cooler that is strategically oriented and shrouded to face its annular inlet away axially downstream from the exhaust of the APU to make it inherently fireproof to flames from the APU or any location within the APU compartment that fuel can accumulate.

2 Claims, 2 Drawing Sheets

THERMAL MANAGEMENT FOR AIRCRAFT AUXILIARY POWER UNIT COMPARTMENT

CROSS REFERENCE TO RELATED APPLICATIONS

This Application claims the benefit of the filing date for prior filed co-pending Provisional Application Ser. No. 60/510,802, filed 10 Oct. 2003.

FIELD OF THE INVENTION

The invention relates to an auxiliary power unit (APU) for aircraft, and more particularly to an improved passive cooling system for thermal management of a compartment housing such APUs.

BACKGROUND OF THE INVENTION

Thermal management of the auxiliary power unit (APU) compartment for a high-powered aircraft presents a challenge. A suitable cooling system for such an application must insure that the APU oil, that is, the oil used to lubricate and carry heat away from the APU and the generators that load the APU, as well as the air in the compartment that houses the APU is properly cooled.

Typically, a cooling system generates and directs an air stream through fins of air-cooled APU oil cooler to cool the APU oil. This air stream may comprise ambient air, compartment air, or a combination thereof. An active means, such as a powered fan, or a passive means, such as a well-known eductor, otherwise known as a jet pump or ejector, may generate and direct the air stream through the APU oil cooler. A passive system is advantageous from the standpoint of weight reduction and reliability.

Compartment air is preferably replenished from ambient to aid in cooling the APU compartment. In a passive cooling system, the compartment air typically combines with the exhaust gas stream of the APU. The high velocity exhaust gas of the APU provides an eduction effect that pumps the low velocity air out of the APU compartment. Circulation of the compartment air in this way draws cool ambient air into the compartment through a suitable aperture in the compartment, and this serves to cool the compartment.

It is advantageous to pass the circulated compartment air through the fins of the oil cooler to more effectively cool the APU oil. Therefore, appropriate ductwork may direct the stream of evacuated compartment air through the oil cooler as it is pumped from the APU compartment.

Current passive cooling systems are bulky and complex, and their ability to distribute and ventilate compartment air is limited. Furthermore, they do not have any inherent ability to protect the oil cooler from flames that may emanate from the APU or pooled fuel in the compartment.

SUMMARY OF THE INVENTION

The invention comprises an improved passive cooling system for an aircraft APU compartment that includes a lightweight annular air-cooled oil cooler that is strategically oriented and shrouded to face its annular inlet axially downstream from the exhaust of the APU to make it inherently fireproof to flames from the APU or any location within the APU compartment that fuel can accumulate.

DESCRIPTION OF THE EMBODIMENT

Figure 1:
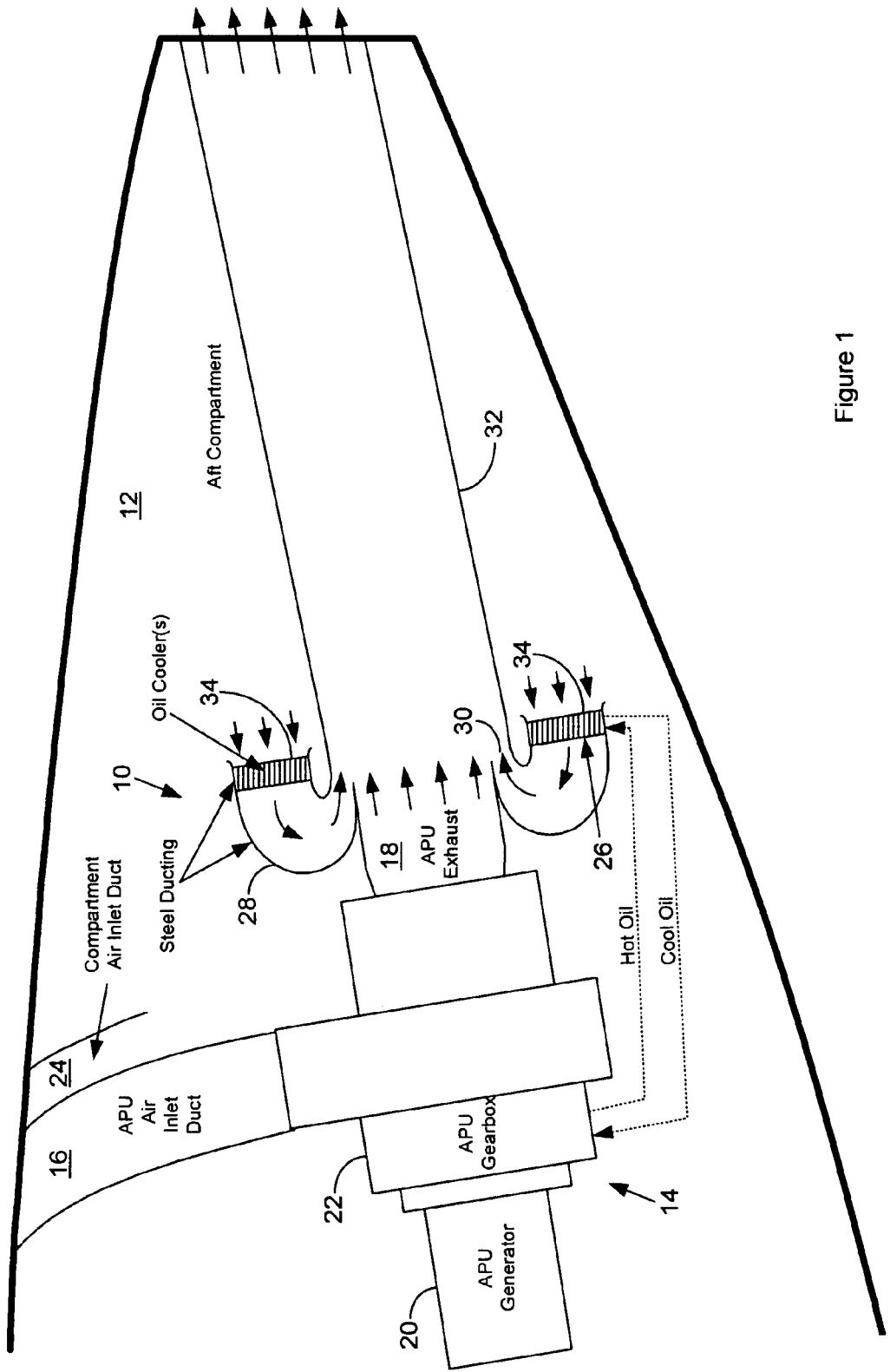
FIG. 1 is a cut-away side view of a passive APU compartment cooling system according to the invention as positioned in a tail cone of an aircraft.

FIG. 1 is a cut-away side view of a passive APU compartment cooling system 10 according to the invention as positioned in a tail cone APU compartment 12 of an aircraft, and APU 14 with an associated APU inlet duct 16 and exhaust duct 18. APU combustion air enters the APU 14 from ambient through the APU inlet duct 16.

The APU 14 then compresses the combustion air, adds fuel, and combusts the resulting fuel/air mixture. The resulting hot, high-pressure combustion gas then expands through at least one turbine (not shown) within the APU 14. The turbine generates power for associated devices, such as a generator 20, through a gearbox 22 that is coupled to the turbine.

The spent combustion gas leaving the turbine then exhausts through the exhaust duct 18 at relatively high velocity. Cooling air from ambient enters the compartment 12 through a compartment inlet duct 24. Compartment air flows through the fins of at least one air-cooled annular APU oil cooler 26 and an annular duct 28 that encapsulates the oil cooler 26 into a very simple eductor 30, otherwise known as a jet pump or ejector.

Through the mechanics of viscous shear and fluid diffusion, the eductor 30 "pumps" the compartment air into an APU tailpipe 32 coupled to the eductor 30 by transferring the momentum and kinetic energy of the high velocity exhaust gas (driver or primary stream) exhausting from the exhaust duct 18 to the low energy stream of compartment air (driven or secondary stream) that flows through the annular oil cooler 26 and annular duct 28 that surrounds the high velocity exhaust duct 18.

Figure 2:
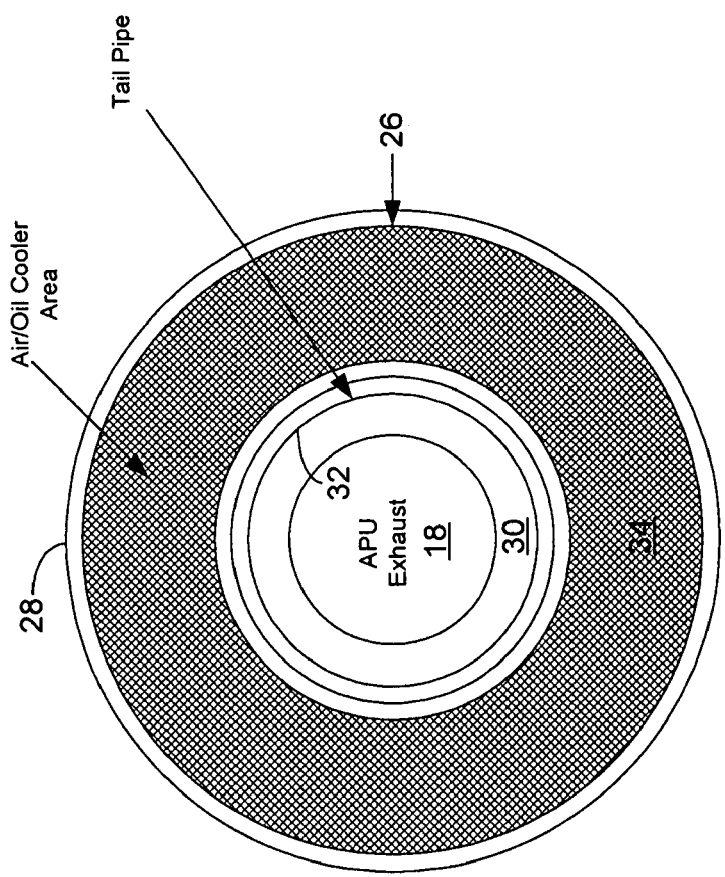
FIG. 2 comprises a detailed cut-away side view and cut-away end view of the shrouded air/oil cooler according to the invention.
Figure 2:
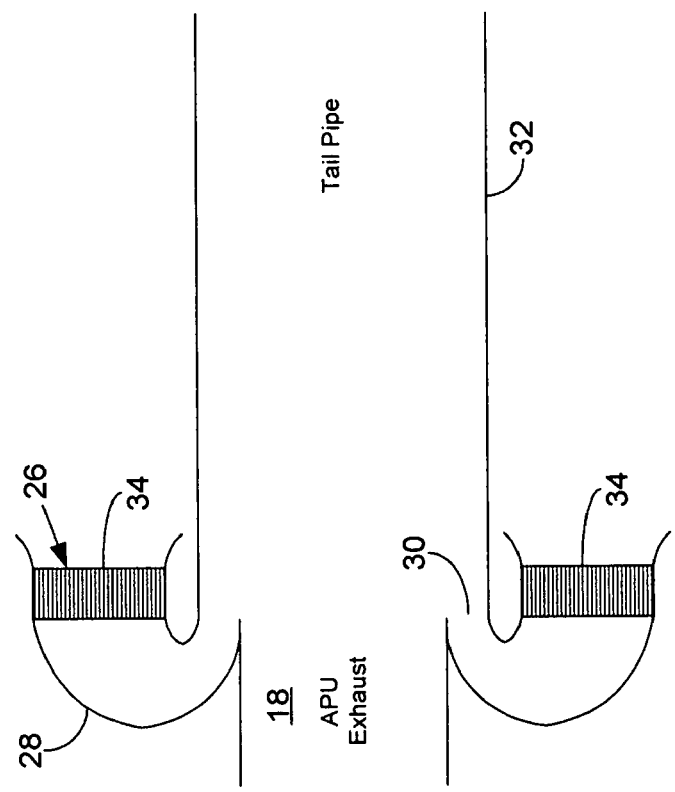

The pumped driven or secondary stream compartment air absorbs the compartment heat generated by the hot running APU 14 and then flows through the oil cooler 26 where it absorbs all the APU 14 and generator 20 system waste heat. The combined driver and driven or primary and secondary streams then flow out of the compartment through the APU tail pipe 32. As shown in FIG. 2, the annular oil cooler 26 is strategically oriented and shrouded by the annular duct 28 in a way to make them inherently fireproof. Specifically, the annular duct 28 positions an annular inlet 34 of the air cooler 26 to face axially downstream from the exhaust of the APU 14. In this way, the lightweight core of the oil cooler 28, typically comprising a metal with high heat transfer characteristics, such as aluminium, is shielded in a way to withstand any flames emanating from the APU 14 or any location within the APU compartment 12 that fuel can accumulate.

Besides the efficient removal of waste heat from the oil for the APU 14 and APU compartment 12, this arrangement also offers the following advantages:

Facing the annular inlet 34 of the oil cooler 26 axially downstream from the exhaust of the APU 14 as well as manufacturing it in an annular configuration shrouded by the conforming annular duct 28 fabricated of a durable and fireproof material, such as steel sheet metal, allows the oil cooler 26 to withstand any flames emanating from the APU 14 or any location that fuel can accumulate within the APU compartment 12, thus making this arrangement inherently fireproof to better comply with all FAA requirements for fireproofing.

Facing the annular inlet 34 of the oil cooler 26 axially downstream from the inlet air duct 24 provides much better compartment air distribution and ventilation and allows lower aft compartment temperatures.

The annular arrangement of the oil cooler 26 around the APU exhaust duct 18 offers a more compact, lightweight and high performance cooling system 10.

Thus there has been described herein a compact, lightweight and fireproof passive cooling system for thermal management of the APU compartment in high powered aircraft that comprises a lightweight annular air-cooled oil cooler that is strategically oriented and shrouded to face its annular inlet away axially downstream from the exhaust of the APU to make it inherently fireproof to flames from the APU or any location within the APU compartment that fuel can accumulate. It should be understood that the embodiment described above is only one illustrative implementation of the invention, that the various parts and arrangement thereof may be changed or substituted, and that the invention is only limited by the scope of the attached claims.

What is claimed is:

1. A fire-resistant and lightweight passive cooling system for an aircraft auxiliary power unit (APU) compartment that contains an APU, comprising:
    a compartment inlet duct opening to ambient;
    an APU exhaust duct;
    an APU tail pipe;
    at least one annular air-cooled oil cooler for the APU that circumscribes the APU exhaust duct;
    an annular fire-resistant duct that circumscribes and couples to the exhaust duct and faces an annular inlet of the oil cooler axially downstream from the exhaust of the APU; and
    an eductor that couples the APU exhaust duct and the annular duct to the APU tail pipe.

2. A fire-resistant and lightweight passive cooling system for an aircraft auxiliary power unit (APU) compartment that contains an APU, comprising:
    a compartment inlet duct opening to ambient for drawing ambient air;
    an APU exhaust duct for exhausting high velocity APU exhaust gas;
    an APU tail pipe;
    at least one annular air-cooled oil cooler for the APU that circumscribes the APU exhaust duct for cooling oil with compartment air;
    an annular fire-resistant duct that circumscribes and couples to the exhaust duct and faces an annular inlet of the oil cooler axially downstream from the exhaust of the APU for directing a stream of low velocity compartment air through the oil cooler; and
    an eductor that couples the APU exhaust duct and the annular duct to the APU tail pipe to pump the low velocity compartment air from the annular duct with the high velocity exhaust gas from the APU exhaust duct out of the APU tail pipe.

* * * * *